(12) United States Patent
Daly (10) Patent No.: US 9,071,946 B2
(45) Date of Patent: *Jun. 30, 2015

(54) PROVISION OF TEXT MESSAGES TO EMERGENCY CALL TAKERS

(71) Applicant: AT&T Mobility II LLC, Atlanta, GA (US)

(72) Inventor: Brian K. Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/014,581

(22) Filed: Aug. 30, 2013

(65) Prior Publication Data

US 2013/0344841 A1    Dec. 26, 2013

Related U.S. Application Data

(63) Continuation of application No. 12/967,994, filed on Dec. 14, 2010, now Pat. No. 8,538,468.

(51) Int. Cl.
| | | |
|---|---|---|
| *H04W 4/00* | (2009.01) | |
| *H04W 4/12* | (2009.01) | |
| *H04M 11/04* | (2006.01) | |
| *H04W 4/22* | (2009.01) | |
| *H04W 76/00* | (2009.01) | |
| *H04M 3/42* | (2006.01) | |
| *H04M 3/51* | (2006.01) | |
| *H04W 4/14* | (2009.01) | |
| *H04W 76/02* | (2009.01) | |

(52) U.S. Cl.
CPC ............... *H04W 4/12* (2013.01); *H04M 11/04* (2013.01); *H04W 4/14* (2013.01); *H04W 4/22* (2013.01); *H04W 76/007* (2013.01); *H04W 76/025* (2013.01); *H04M 3/42382* (2013.01); *H04M 3/5116* (2013.01)

(58) Field of Classification Search
USPC ............... 455/466, 404.1, 521; 701/515–519; 379/45, 142.1, 207.12
See application file for complete search history.

(56) References Cited

U.S. PATENT DOCUMENTS

| | | |
|---|---|---|
| 2002/0128025 A1 | 9/2002 | Sin |
| 2010/0004035 A1 | 1/2010 | Ray et al. |
| 2010/0304766 A1 | 12/2010 | Goyal |

*Primary Examiner* — Wayne Cai
(74) *Attorney, Agent, or Firm* — Baker & Hostetler LLP (57) ABSTRACT

Concurrent text and voice communications can be maintained with an emergency call taker. An application executing on a mobile communications device in conjunction with a network gateway provide voice communication as well as an interactive Short Messaging System (SMS) session with a public safety answering point (PSAP). The gateway correlates and manages SMS messages with the PSAP and the mobile device. As such, a virtual session is generated over a traffic channel, that provides the advantages of a voice call as well as allowing text based communications.

20 Claims, 7 Drawing Sheets

PROVISION OF TEXT MESSAGES TO EMERGENCY CALL TAKERS

CROSS REFERENCE TO RELATED APPLICATIONS

The instant application is a continuation of, and claims priority to, U.S. patent application Ser. No. 12/967,994, filed Dec. 14, 2010. U.S. patent application Ser. No. 12/967,994 is incorporated herein by reference in its entirety.

TECHNICAL FIELD

The technical field generally relates to public safety, and more specifically relates to providing Short Messaging Service (SMS) text messages to public safety answering points (PSAPs).

BACKGROUND

Typically, in a emergency situation, an individual calls 911. More currently however, the popularity of text messaging has grown to the point that many people prefer sending and receiving a text message rather than making and receiving a voice based call. Current text messaging systems, such as the Short Messaging System (SMS) are not compatible with today's emergency services.

SUMMARY

An application installed on a mobile communications device facilitates voice communication as well as an interactive Short Messaging System (SMS) session with a public safety answering point (PSAP). In an example embodiment, a gateway residing in a network correlates and manages SMS messages with the PSAP and the mobile device. As such, a virtual session is generated over a voice channel (also referred to as a traffic channel), that provides the advantages of a voice call as well as allowing text based communications over the same path. A user of the mobile communications device is able to create and view text messages while engaged in a phone call.

DETAILED DESCRIPTION OF ILLUSTRATIVE EMBODIMENTS

Figure 1:
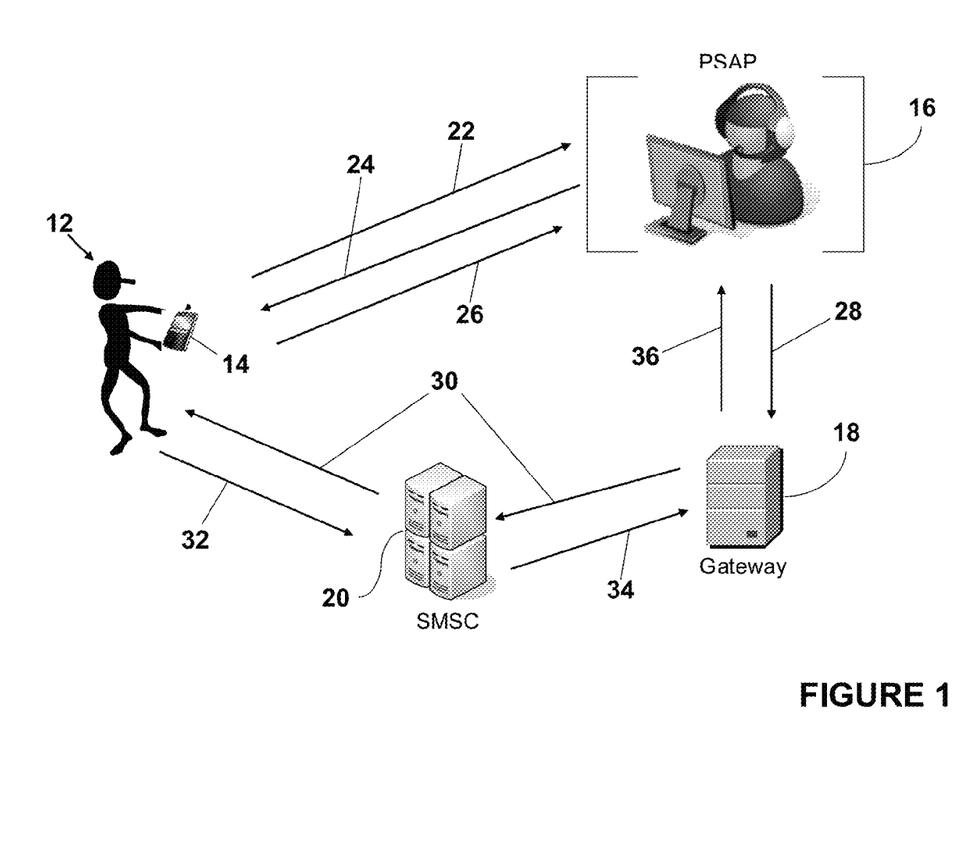
FIG. 1 illustrates an example system and process for communicating with an emergency call taker via a text message.

FIG. 1 illustrates an example system and process for communicating with an emergency call taker via a text message. As depicted in FIG. 1, user 12, wants to make an emergency call to an emergency service for example (e.g., to 911). The user 12 can start an application that has previously been installed on his/her mobile communications device 14. The application can provide the user 12, via a user interface, or the like, on the mobile communications device 14, the option to initiate a text based session. In an example configuration, a text based session could automatically be initiated via preferences in the user's profile. Responsive to initiating the text based session, a call is placed to public safety answering point (PSAP) 16, at step 22 (e.g., 911 is dialed). When the 911 call taker at the PSAP 16 answers the call, an indication that the call has been answered is sent from the PSAP 16 to the mobile communications device 14 at step 24. When the 911 call taker at the PSAP 16 answers the call, the call taker hears an audio message indicating that a text message is to follow. This informs the call taker that the emergency call will be in the form of a text session. The message can be a predetermined, previously recorded message. The message can be a digitally recorded message. In an example embodiment, the message is sent by the mobile communications device 14 to the PSAP 16 at step 26. In another example embodiment, an indicator is sent by the mobile communications device 14 to the PSAP 16 at step 26. The indicator indicates that a predetermined message (e.g., "Text message to follow") is to be retrieved, for example, from storage at the PSAP 16 and/or from external storage (external to the PSAP 16, such as a database for example), and rendered (e.g., audibly) to the call taker. The indicator can comprise any appropriate indication means for indicating that a message is to be retrieved.

The user 12 is provided means for entering text via the mobile communications device 14. In an example configuration, the a screen is displayed on the mobile communications device 14, wherein the user 12 may enter text to be delivered to the PSAP call taker. The text could appear as a character by character or line by line entry, could appear similar to an instant message, could appear similar to a chat session, or the like, or any combination thereof. In an example embodiment, speech could be converted to text, and the converted text can be used as the text message. Speech can be converted to text via any appropriate conversion means. In another example embodiment, the text could be pre-stored messages in the application on the mobile communication device 14. The mobile communication device 14 may also have the capability to determine its location, for example using the Global Positioning System (GPS). This location information may also be included in the text message to the PSAP either specified by the user 12 when the text message is created, or can be requested by the PSAP call taker through a text message to the mobile communication device 14 requesting the location information (e.g. "Location Request").

The PSAP call taker initiates a process to send a session initiation message from the PSAP 16 to the gateway 18. The session initiation message is sent from the PSAP 16 to the gateway 18, at step 28. The session initiation message comprises an indication that the session between the call taker and the user is a text session. The session initiation message also can comprise an indication as to which call taker will be handling the session. The indication of the call taker handling the session with the device can be an ID associated with the call taker, or any appropriate identification means. The session initiation message further can comprise an indication of the identity of the device (e.g., mobile communications device 14) being used for the session. In an example embodiment, the identity of the device is the phone number of the device. However, the identify of the device can comprise any appropriate identification means. In an example configuration, the gateway 18 stores the information (e.g., identity of the call taker handling the session, identity of the device, and/or indication that the session between the call taker and the user is text session) received in the session initiation message. This information can be stored in the gateway 18, external to the gateway 18, or a combination thereof.

At step 30, the gateway 18 sends a text message to the mobile device 14 via a traffic channel indicating that the PSAP 16 has established the session. A traffic channel in a cellular system carries voice and data information between a mobile device and a network. A control channel carries signaling, control, and data information between the mobile device and the network. A control channel does not carry voice information, and but carry limited user data information such as SMS or cell broadcast text messages. The text message can be any appropriate message (e.g., "Text Session Established"). The message can be a predetermined, previously recorded message. In an example embodiment, the message is sent by the gateway 18 to the mobile communications device 14 at step 30. In another example embodiment, an indicator is sent by the gateway 18 to the mobile communications device 14 at step 30. The indicator indicates that a predetermined message (e.g., "Text Session Established") is to be retrieved, for example, from storage, on mobile communications device 14, and/or from external storage (external to the mobile device 14, such as a database for example), and rendered (e.g., visually) to the user. The indicator can comprise any appropriate indication means for indicating that a message is to be retrieved.

The user 12 may then enter emergency information via the mobile communications device 14. Upon completion, the user sends the text message, which is delivered over the voice channel, to the Short Message Service Center (SMSC) 20, at step 32. The application, executing on the mobile communications device 14, ensures that the destination address of the text message is 911 or other appropriate address indicating an emergency message. The SMSC 20 recognizes that the destination address of the text message is 911 and immediately forwards the text message to the gateway 18 at step 34.

Upon receipt of the text message (from step 34), the gateway 18 determines the PSAP call taker handling the session. In an example embodiment, the gateway 18 correlates the incoming text message with the information provided in the session initiation message (received via step 28) to determine the call taker handling the session. The gateway 18 can correlate the incoming text message with the information provided in the session initiation message in any appropriate manner. For example, the gateway 18 can determine (from the text message received via step 34) the identity of the device sending the text message (e.g., phone number of the device), and use the identity of the device to determine the call taker handling the session for that device. Upon determining the call taker handling the session, the gateway 18 sends the text message to call taker handling the session at step 36. At this point, two way communications via text messages can continue between the PSAP 16, the gateway 18, the SMSC 20, and the mobile communications device 14.

The user 12, via the application executing on the mobile communication device 14 can maintain concurrent voice communication with the call taker handling the session at PSAP 16. Communication between the user 12 and the call taker is interactive. Thus, the system and process depicted in FIG. 1 provide for an interactive SMS session with a PSAP over a traffic channel that can be maintained concurrently with voice communications between the user and the call taker. The system and process described herein avoid latency issues because a text message is not required to be stored until a recipient is located.

Figure 2:
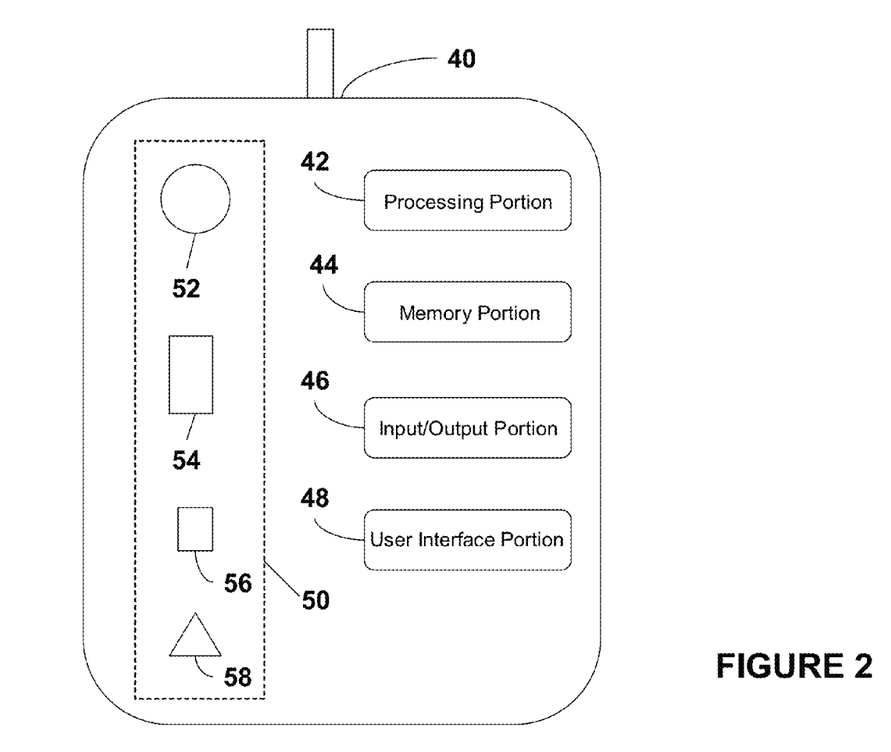
FIG. 2 is a block diagram of an example wireless communications device 40 that is configurable to be communicate with an emergency call taker via a text message.

FIG. 2 is a block diagram of an example wireless communications device 40 that is configurable to be communicate with an emergency call taker via a text message. In an example configuration, the wireless communications device 40 is a mobile wireless device. The communications device 40 can include any appropriate device, mechanism, software, and/or hardware for facilitating communication with an emergency call taker via a text message as described herein. As described herein, the communications device 40 comprises hardware or a combination of hardware and software. In an example configuration, the communications device 40 comprises a processing portion 42, a memory portion 44, an input/output portion 46, a user interface (UI) portion 48, and a sensor portion 50 comprising at least one of a video camera portion 52, a force/wave sensor 54, a microphone 56, a moisture sensor 58, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 58 is capable of detecting moisture, such as detecting if the communications device 40 is submerged in a liquid. The processing portion 42, memory portion 44, input/output portion 46, user interface (UI) portion 48, video camera portion 52, force/wave sensor 54, and microphone 56 are coupled together to allow communications therebetween (coupling not shown in FIG. 2). The communications device can comprise a timer (not depicted in FIG. 2).

In various embodiments, the input/output portion 46 comprises a receiver of the communications device 40, a transmitter of the communications device 40, or a combination thereof. The input/output portion 46 is capable of receiving and/or providing information pertaining to utilizing communication with an emergency call taker via a text message via the communications device 40 as described herein. The input/output portion 46 also is capable of communications with the gateway 18, as described herein. For example, the input/output portion 46 can include a wireless communications (e.g., 2.5G/3G/GPS) SIM card. The input/output portion 46 is capable of receiving and/or sending video information, audio information, control information, image information, data, or any combination thereof. In an example embodiment, the input/output portion 46 is capable of receiving and/or sending information to determine a location of the communications device 40. In an example configuration, the input\output portion 46 comprises a GPS receiver. In an example configuration, the communications device 40 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 46 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 42 is capable of facilitating communication with an emergency call taker via a text message via the communications device 40 as described herein. For example, the processing portion 42 is capable of, in conjunction with any other portion of the communications device 40, executing an application for facilitating communication with an emergency call taker via a text message, generating a text message, processing a received text message, processing a retrieved text message, generating a predetermined message, retrieving a predetermined message, processing text messages provided via the user interface portion 48, processing text messages received via the input/output portion 46, or the like, or any combination thereof. The processing portion 42, in conjunction with any other portion of the communications device 40, can provide the ability for users/subscribers to enable, disable, and configure various features of an application for facilitating communication with an emergency call taker via a text message, as described herein. For example, a user, subscriber, parent, healthcare provider, law enforcement agent, of the like, can define configuration parameters such as, for example, an emergency contact list, voice/text/image/video options for an emergency call, threshold settings (e.g., timer settings, signature settings, etc.), to be utilized when sending and/or receiving a text message to/from an emergency call taker. The processing portion 42, in conjunction with any other portion of the communications device 40, enables the communications device 40 to covert speech to text when it is configured to send text messages while facilitating communication with an emergency call taker via a text message. In an example embodiment, the processing portion 42, in conjunction with any other portion of the communications device 40, can convert text to speech for rendering via the user interface portion 48.

In a basic configuration, the communications device 40 can include at least one memory portion 44. The memory portion 44 can store any information utilized in conjunction with facilitating communication with an emergency call taker via a text message as described herein. For example, the memory portion 44 is capable of storing information pertaining to a location of a communications device 40, a predetermined text message, a text message, a predetermined audio message, an audio message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of processor, the memory portion 44 can be volatile (such as some types of RAM), non-volatile (such as ROM, flash memory, etc.). The communications device 40 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 44, or a portion of the memory portion 42 is hardened such that information stored therein can be recovered if the communications device 40 is exposed to extreme heat, extreme vibration, extreme moisture, corrosive chemicals or gas, or the like. In an example configuration, the information stored in the hardened portion of the memory portion 44 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 44 intelligible.

The communications device 40 also can contain a UI portion 48 allowing a user to communicate with the communications device 40. The UI portion 48 is capable of rendering any information utilized in conjunction facilitating communication with an emergency call taker via a text message as described herein. For example, the UI portion 48 can provide means for entering text, entering a phone number, rendering text, rendering images, rendering multimedia, rendering sound, rendering video, receiving sound, or the like, as described herein. The UI portion 48 can provide the ability to control the communications device 40, via, for example, buttons, soft keys, voice actuated controls, a touch screen, movement of the mobile communications device 40, visual cues (e.g., moving a hand in front of a camera on the mobile communications device 40), or the like. The UI portion 48 can provide visual information (e.g., via a display), audio information (e.g., via speaker), mechanically (e.g., via a vibrating mechanism), or a combination thereof. In various configurations, the UI portion 48 can comprise a display, a touch screen, a keyboard, a speaker, or any combination thereof. The UI portion 48 can comprise means for inputting biometric information, such as, for example, fingerprint information, retinal information, voice information, and/or facial characteristic information. The UI portion 48 can be utilized to enter an indication of the designated destination (e.g., the phone number, IP address, or the like).

In an example embodiment, the sensor portion 50 of the communications device 40 comprises the video camera portion 52, the force/wave sensor 54, and the microphone 56. The video camera portion 52 comprises a camera and associated equipment capable of capturing still images and/or video and to provide the captured still images and/or video to other portions of the communications device 40. In an example embodiment, the force/wave sensor 54 comprises an accelerometer, a tilt sensor, an acoustic sensor capable of sensing acoustic energy, an optical sensor (e.g., infrared), or any combination thereof.

Figure 3:
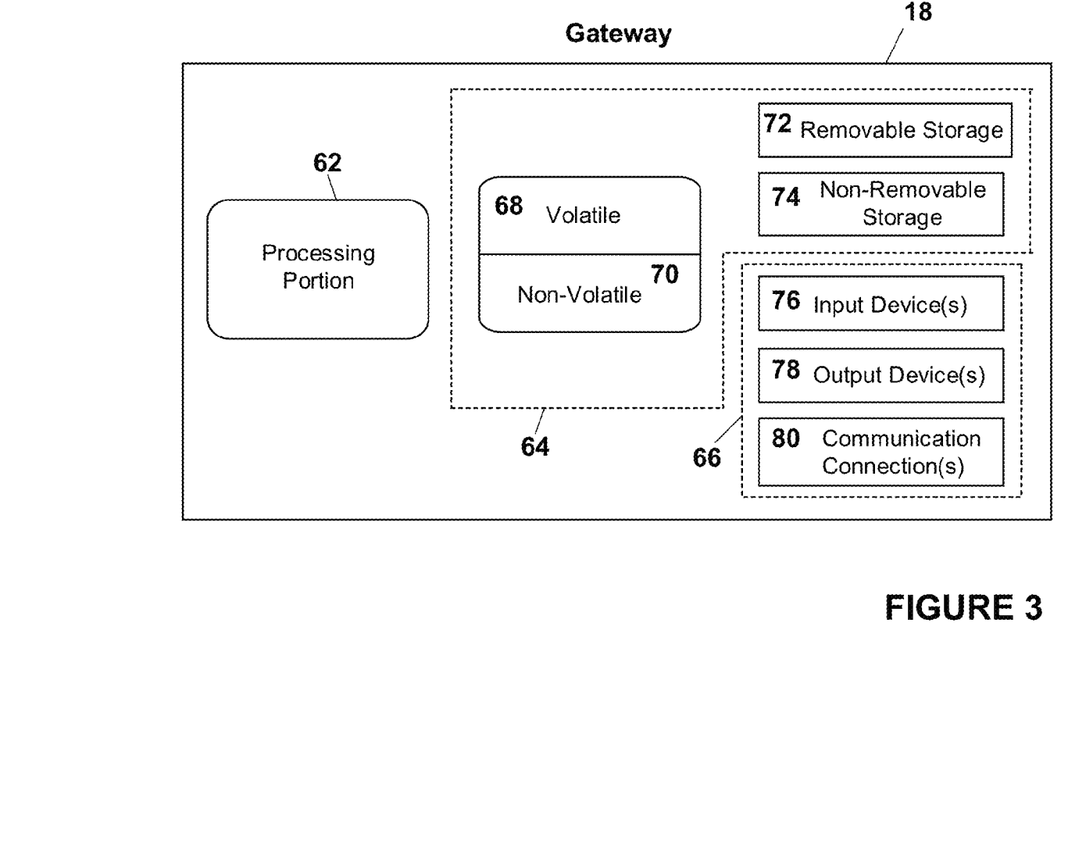
FIG. 3 is a block diagram of an example gateway 18.

FIG. 3 is a block diagram of an example gateway 18. In an example embodiment, the gateway 18 comprises a network entity comprising hardware or a combination of hardware and software. When used in conjunction with a network, the functionality needed to implement communication with an emergency call taker via a text message can reside in any one or combination of gateways. The gateway 18 depicted in FIG. 3 represents any appropriate network entity, or combination of network entities, such as a processor, a server, a gateway, etc., or any combination thereof. In an example configuration, the gateway 18 comprises a component or various components of a short message entity in a wireless network. It is emphasized that the block diagram depicted in FIG. 3 is exemplary and not intended to imply a specific implementation or configuration. Thus, the gateway 18 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the gateway 18 comprises a processing portion 62, a memory portion 64, and an input/output portion 38. The processing portion 62, memory portion 64, and input/output portion 38 are coupled together (coupling not shown in FIG. 3) to allow communications therebetween. The input/output portion 38 is capable of receiving and/or providing information from/to a device (e.g., device 40) and/or other gateways configured to be utilized when communicating with an emergency call taker via a text message.

The processing portion 62 is capable of performing functions associated with the communicating with an emergency call taker via a text message, as described herein. For example, the input/output portion 64 is capable of, in conjunction with any other portion of the gateway 18, generating a text message, processing a received text message, processing a retrieved text message, generating a predetermined message, retrieving a predetermined message, correlating a text message with the information provided in a session initiation message, determining a call taker handling a session, or the like, or any combination thereof.

The memory portion 64 can store any information utilized in conjunction with communication with an emergency call taker via a text message, as described herein. For example, the memory portion 64 is capable of storing information pertaining to a location of a communications device 40, a location of a gateway 18, a predetermined text message, a text message, a predetermined audio message, an audio message, subscriber profile information, subscriber identification information, phone numbers, an identification code of the communications device, video information, audio information, control information, information pertaining to a call taker handling a session, information pertaining to correlating a text message with information provided in the session initiation message, or a combination thereof. Depending upon the exact configuration and type of gateway 18, the memory portion 64 can include computer readable storage media that is volatile 68 (such as dynamic RAM), non-volatile 70 (such as ROM), or a combination thereof. The gateway 18 can include additional storage, in the form of computer readable storage media (e.g., removable storage 72 and/or non-removable storage 74) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the gateway 18. As described herein, a computer-readable storage medium is an article of manufacture.

The gateway 18 also can contain communications connection(s) 80 that allow the gateway 18 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. Communication media can include wired media such as a wired network or direct-wired connection, and wireless media such as acoustic, RF, infrared, and other wireless media. The term computer readable media as used herein includes both storage media and communication media. The gateway 18 also can include input device(s) 76 such as keyboard, mouse, pen, voice input device, touch input device, etc. Output device(s) 78 such as a display, speakers, printer, etc. also can be included.

The communications device (e.g., communications device 40) and the network entity (gateway 18) can be part of and/or in communication with various wireless communications networks. Some of which are described below.

Figure 4:
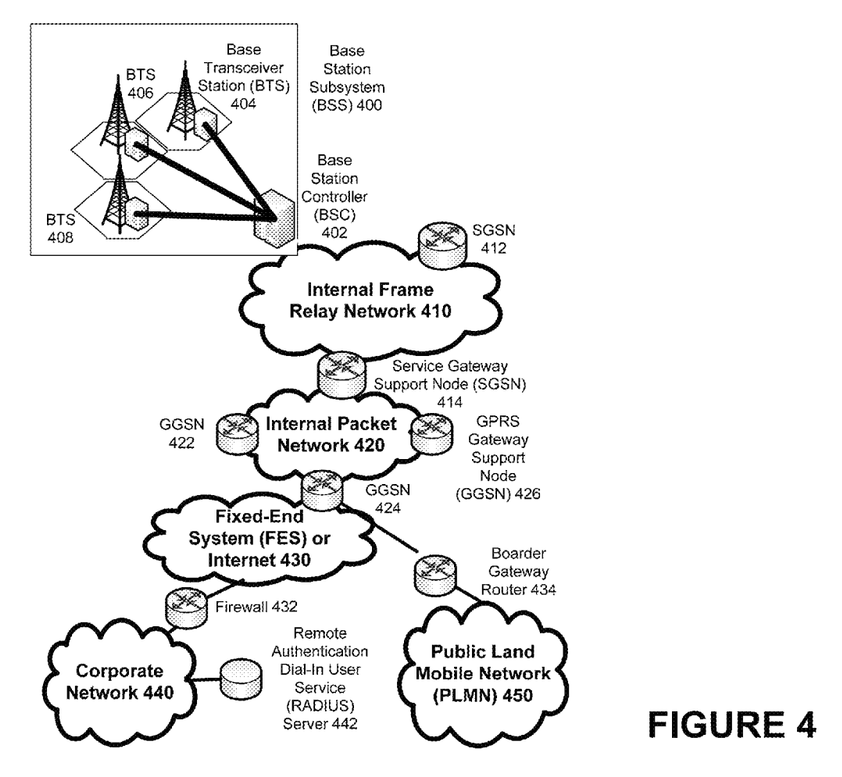
FIG. 4 depicts an overall block diagram of an exemplary packet-based mobile cellular network environment, such as a GPRS network, in which communication with an emergency call taker via a text message can be implemented.

FIG. 4 depicts an overall block diagram of an exemplary packet-based mobile cellular network environment, such as a GPRS network, in which communication with an emergency call taker via a text message can be implemented. In the exemplary packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
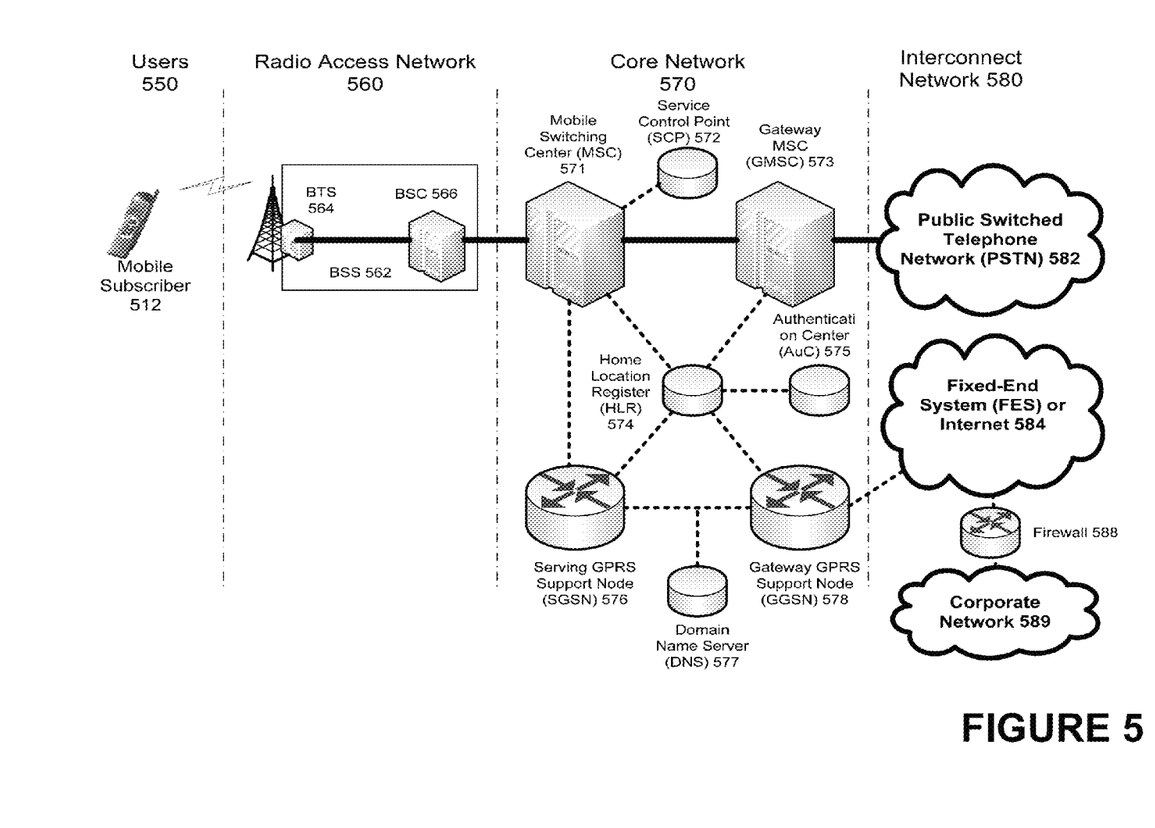
FIG. 5 illustrates an architecture of a typical GPRS network in which communication with an emergency call taker via a text message can be implemented.

FIG. 5 illustrates an architecture of a typical GPRS network in which communication with an emergency call taker via a text message can be implemented. The architecture depicted in FIG. 5 is segmented into four groups: users 550, radio access network 560, core network 570, and interconnect network 580. Users 550 comprise a plurality of end users. Note, device 512 is referred to as a mobile subscriber in the description of network shown in FIG. 5. In an example embodiment, the device depicted as mobile subscriber 512 comprises a communications device (e.g., wireless anti-theft security communications device 12). Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 6:
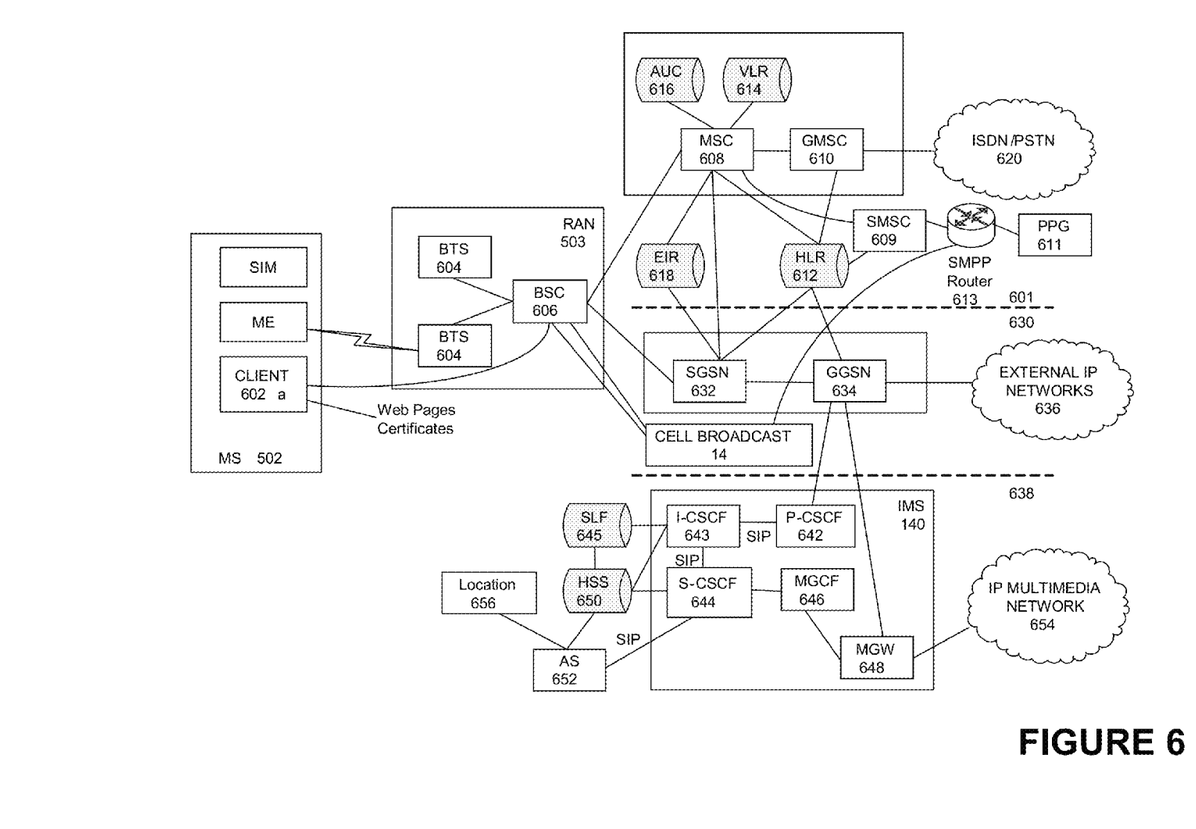
FIG. 6 illustrates an exemplary block diagram view of a GSM/GPRS/IP multimedia network architecture within which communication with an emergency call taker via a text message can be implemented.

FIG. 6 illustrates an exemplary block diagram view of a GSM/GPRS/IP multimedia network architecture within which communication with an emergency call taker via a text message can be implemented. As illustrated, the architecture of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 638 was introduced with 3GPP Release 6, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656

(e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 7:
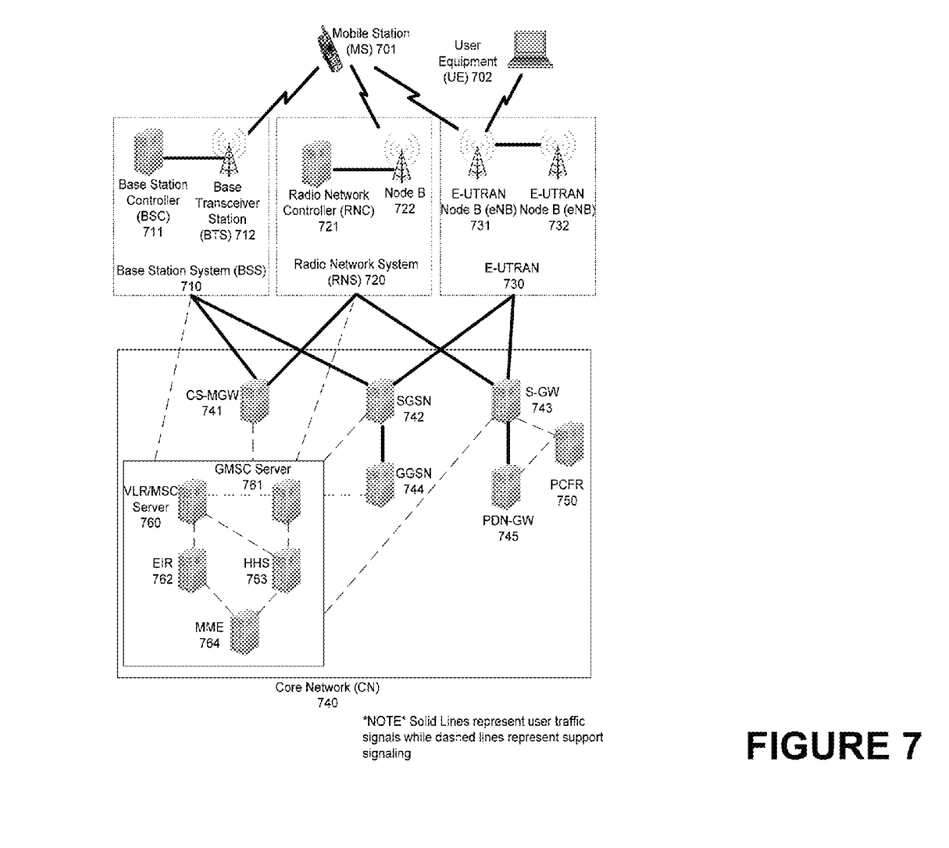
FIG. 7 illustrates a PLMN block diagram view of an exemplary architecture in which the above described embodiments of communication with an emergency call taker via a text message may be incorporated.

FIG. 7 illustrates a PLMN block diagram view of an exemplary architecture in which the above described embodiments of communication with an emergency call taker via a text message may be incorporated. Mobile Station (MS) 701 is the physical equipment used by the PLMN subscriber. In one illustrative embodiment, communications device 40 may serve as Mobile Station 701. Mobile Station 701 may be one of, but not limited to, a cellular telephone, a cellular telephone in combination with another electronic device or any other wireless mobile communication device.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. Typically, BSS 710 performs functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 performs functions such as, but not limited to, load control, packet scheduling, handover control, security functions, as well as controlling Mobile Station 701's access to the Core Network (CN) 740.

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 730 may include of series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 7-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 701 may communicate with any or all of BSS 710, RNS 720, or E-UTRAN 730. In a illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 740 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information, and stores subscription data regarding Mobile Station 701 or User Equipment 702 for handling calls or data sessions. Networks may contain one HSS 763 or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 provides user location functionality. When Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

While example embodiments of communication with an emergency call taker via a text message have been described in connection with various computing devices/processors, the underlying concepts can be applied to any computing device, processor, or system capable of facilitating communication with an emergency call taker via a text message as described herein. The methods and apparatuses for facilitating communication with an emergency call taker via a text message, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for implementing communication with an emergency call taker via a text message. A computer-readable storage medium, as described herein is an article of manufacture. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for communication with an emergency call taker via a text message can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating communication with an emergency call taker via a text message. When implemented on a general-purpose processor, the program code combines with the processor to provide a unique apparatus that operates to invoke the functionality communication with an emergency call taker via a text message.

While communication with an emergency call taker via a text message has been described in connection with the various embodiments of the various figures, it is to be understood that other similar embodiments can be used or modifications and additions can be made to the described embodiments for facilitating communication with an emergency call taker via a text message. For example, one skilled in the art will recognize that using a communications device to facilitate communication with an emergency call taker via a text message as described in the present application may apply to any environment, whether wired or wireless, and may be applied to any number of such devices connected via a communications network and interacting across the network. Therefore, communication with an emergency call taker via a text message should not be limited to any single embodiment, but rather should be construed in breadth and scope in accordance with the appended claims.

What is claimed:

1. An apparatus comprising:
    a processor; and
    memory coupled to the processor, the memory comprising executable instructions that when executed by the processor cause the processor to effectuate operations comprising:
        initiating a text based session between a device and public safety answering point (PSAP) equipment;
        responsive to initiating the text based session, establishing a voice call, wherein:
            an intended recipient of the voice call is the PSAP equipment;
            the voice call comprises an audio indication that a first text message is forthcoming;

receiving, via a traffic channel, a second text message comprising an indication that a text session has been established between the device and the PSAP equipment, wherein the received second text message is received from an intermediate entity other than the PSAP equipment;

responsive to receiving the second text message, providing the first text message, wherein:
an intended recipient of the first text message is the PSAP equipment via the intermediate entity; and
the voice call and the text session are concurrently active.

2. The apparatus of claim 1, wherein the audio indication further comprises an indication that the first text message pertains to an emergency.

3. The apparatus of claim 1, wherein the audio indication comprises a prerecorded message.

4. The apparatus of claim 1, the text based session is initiated based on a user profile.

5. The apparatus of claim 1, wherein the intermediate entity comprises a network entity.

6. The apparatus of claim 1, wherein the intermediate entity comprises a network gateway.

7. The apparatus of claim 1, wherein the intermediate entity comprises a short message service center.

8. A computer readable storage medium that is not a signal comprising executable instructions that when executed by a processor cause the processor to effectuate operations comprising:

initiating a text based session between a device and public safety answering point (PSAP) equipment;

responsive to initiating the text based session, establishing a voice call, wherein:
an intended recipient of the voice call is the PSAP equipment;
the voice call comprises an audio indication that a first text message is forthcoming;

receiving, via a traffic channel, a second text message comprising an indication that a text session has been established between the device and the PSAP equipment, wherein the received second text message is received from an intermediate entity other than the PSAP equipment;

responsive to receiving the second text message, providing the first text message, wherein:
an intended recipient of the first text message is the PSAP equipment via the intermediate entity; and
the voice call and the text session are concurrently active.

9. The computer readable storage medium of claim 8, wherein the audio indication further comprises an indication that the first text message pertains to an emergency.

10. The computer readable storage medium of claim 8, wherein the audio indication comprises a prerecorded message.

11. The computer readable storage medium of claim 8, the text based session is initiated based on a user profile.

12. The computer readable storage medium of claim 8, wherein the intermediate entity comprises a network entity.

13. The computer readable storage medium of claim 8, wherein the intermediate entity comprises a network gateway.

14. The computer readable storage medium of claim 8, wherein the intermediate entity comprises a short message service center.

15. A method comprising:

initiating a text based session between a device and public safety answering point (PSAP) equipment;

responsive to initiating the text based session, establishing a voice call, wherein:
an intended recipient of the voice call is the PSAP equipment;
the voice call comprises an audio indication that a first text message is forthcoming;

receiving, via a traffic channel, a second text message comprising an indication that a text session has been established between the device and the PSAP equipment, wherein the received second text message is received from an intermediate entity other than the PSAP equipment;

responsive to receiving the second text message, providing the first text message, wherein:
an intended recipient of the first text message is the PSAP equipment via the intermediate entity; and
the voice call and the text session are concurrently active.

16. The method of claim 15, wherein the audio indication further comprises an indication that the first text message pertains to an emergency.

17. The method of claim 15, wherein the audio indication comprises a prerecorded message.

18. The method of claim 15, the text based session is initiated based on a user profile.

19. The method of claim 15, wherein the intermediate entity comprises a network entity.

20. The method of claim 15, wherein the intermediate entity comprises a network gateway.

* * * * *